United States Patent
Shrestha et al.

(10) Patent No.: US 11,758,468 B2
(45) Date of Patent: Sep. 12, 2023

(54) ADMISSION CONTROL FOR RADIO RESOURCE CONTROL SETUP PROCEDURE

(71) Applicant: QUALCOMM Incorporated, San Diego, CA (US)

(72) Inventors: Bharat Shrestha, San Diego, CA (US); Umesh Phuyal, San Diego, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/304,905

(22) Filed: Jun. 28, 2021

(65) Prior Publication Data
US 2022/0015012 A1    Jan. 13, 2022

Related U.S. Application Data

(60) Provisional application No. 62/705,659, filed on Jul. 9, 2020.

(51) Int. Cl.
*H04W 74/08* (2009.01)
*H04W 48/04* (2009.01)
*H04W 36/00* (2009.01)
*H04W 72/51* (2023.01)

(52) U.S. Cl.
CPC ....... *H04W 48/04* (2013.01); *H04W 36/0061* (2013.01); *H04W 72/51* (2023.01); *H04W 74/0833* (2013.01)

(58) Field of Classification Search
CPC .............................. H04W 36/00; H04W 48/04
See application file for complete search history.

(56) References Cited

U.S. PATENT DOCUMENTS

2020/0236598 A1* 7/2020 Kim ................... H04W 36/0079
2022/0346157 A1* 10/2022 Wang ................ H04W 74/0841

FOREIGN PATENT DOCUMENTS

CN          110662307 A     1/2020
WO     WO-2021057980 A1    4/2021

OTHER PUBLICATIONS

CATT: "Discussion on Random Access Procedure for NTN", 3GPP TSG RAN WG2 Meeting #107bis, 3GPP Draft, R2-1912159, 3rd Generation Partnership Project (3GPP), Mobile Competence Centre, 650, Route Des Lucioles, F-06921 Sophia-Antipolis Cedex, France, vol. RAN WG2, No. Chongqing, P.R. China, Oct. 14, 2019-Oct. 18, 2019, Oct. 3, 2019 (Oct. 3, 2019), pp. 1-8, XP051790211, Retrieved from the Internet: URL: http://www.3gpp.org/ftp/tsg_ran/WG2_RL2/TSGR2_107bis/Docs/R2-1912159.zip, [retrieved on Oct. 3, 2019], Paragraph [02.5].

(Continued)

*Primary Examiner* — Michael T Vu
(74) *Attorney, Agent, or Firm* — Harrity & Harrity, LLP

(57) ABSTRACT

Various aspects of the present disclosure generally relate to wireless communication. In some aspects, a user equipment may transmit, to a base station associated with a non-terrestrial network and in connection with a random access procedure, a message that indicates a location of the user equipment; and receive a response to the message that indicates whether the message is accepted or rejected, the response being based at least in part on the location. Numerous other aspects are provided.

30 Claims, 12 Drawing Sheets

(56) References Cited

OTHER PUBLICATIONS

ETSI MCC: "Report of 3GPP TSG RAN2#105bis Meeting Xi'an, China", 3GPP Draft, R2-1905501, 3GPP TSG-RAN WG2 Meeting #106, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, May 13, 2019 (May 13, 2019), XP051729007, 225 Pages, Retrieved from the Internet: URL:http://www.3gpp.org/ftp/Meetings%5F3GPP%5FSYNC/RAN2/Docs/R2%2D1905501%2Ezip [retrieved on May 13, 2019] p. 157, Section 11.11.3, Lines 10-16, and p. 84, 93, 199, Line 16.
International Search Report and Written Opinion—PCT/US2021/070788—ISA/EPO—dated Oct. 19, 2021.

\* cited by examiner

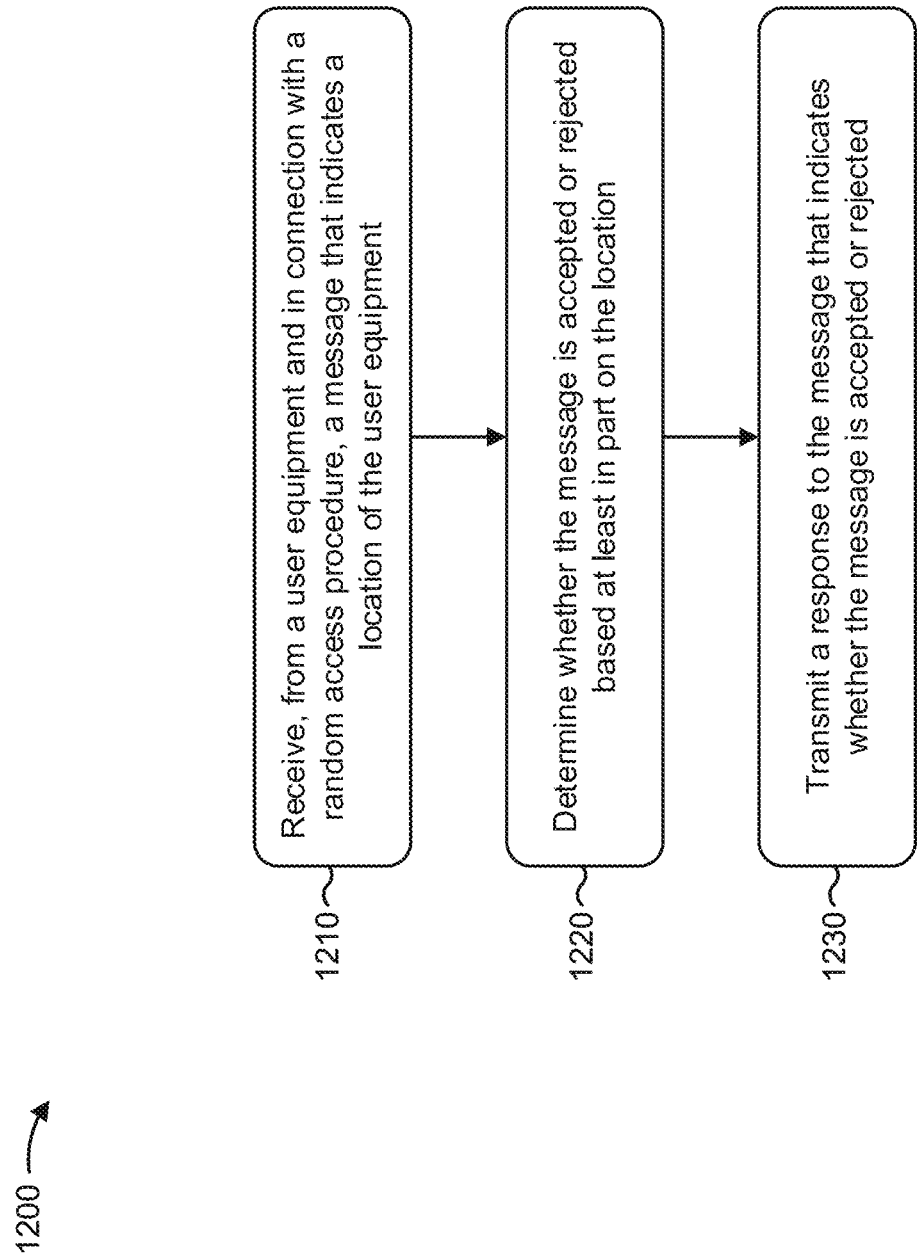

ADMISSION CONTROL FOR RADIO RESOURCE CONTROL SETUP PROCEDURE

CROSS-REFERENCE TO RELATED APPLICATION

This Patent Application claims priority to U.S. Provisional Patent Application No. 62/705,659, filed on Jul. 9, 2020, entitled "ADMISSION CONTROL FOR RADIO RESOURCE CONTROL SETUP PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for admission control for a radio resource control (RRC) setup procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment includes: transmitting, to a base station associated with a non-terrestrial network and in connection with a random access procedure, a message that indicates a location of the user equipment; and receiving a response to the message that indicates whether the message is accepted or rejected, the response being based at least in part on the location.

In some aspects, a method of wireless communication performed by a base station associated with a non-terrestrial network includes: receiving, from a user equipment and in connection with a random access procedure, a message that indicates a location of the user equipment; determining whether the message is accepted or rejected based at least in part on the location; and transmitting a response to the message that indicates whether the message is accepted or rejected.

In some aspects, a UE for wireless communication includes: a memory; and one or more processors coupled to the memory, the memory and the one or more processors configured to: transmit, to a base station associated with a non-terrestrial network and in connection with a random access procedure, a message that indicates a location of the user equipment; and receive a response to the message that indicates whether the message is accepted or rejected, the response being based at least in part on the location.

In some aspects, a base station for wireless communication includes: a memory; and one or more processors coupled to the memory, the memory and the one or more processors configured to: receive, from a user equipment and in connection with a random access procedure, a message that indicates a location of the user equipment; determine whether the message is accepted or rejected based at least in part on the location; and transmit a response to the message that indicates whether the message is accepted or rejected.

In some aspects, a non-transitory computer-readable medium storing one or more instructions for wireless communication includes: one or more instructions that, when executed by one or more processors of a UE, cause the one or more processors to: transmit, to a base station associated with a non-terrestrial network and in connection with a random access procedure, a message that indicates a location of the user equipment; and receive a response to the message that indicates whether the message is accepted or rejected, the response being based at least in part on the location.

In some aspects, a non-transitory computer-readable medium storing one or more instructions for wireless communication includes: one or more instructions that, when executed by one or more processors of a base station, cause the one or more processors to: receive, from a user equipment and in connection with a random access procedure, a message that indicates a location of the user equipment; determine whether the message is accepted or rejected based at least in part on the location; and transmit a response to the message that indicates whether the message is accepted or rejected.

In some aspects, an apparatus for wireless communication includes: means for transmitting, to a base station associated with a non-terrestrial network and in connection with a random access procedure, a message that indicates a location of the apparatus; and means for receiving a response to the message that indicates whether the message is accepted or rejected, the response being based at least in part on the location.

In some aspects, an apparatus for wireless communication includes: means for receiving, from a user equipment and in connection with a random access procedure, a message that indicates a location of the user equipment; means for determining whether the message is accepted or rejected based at least in part on the location; and means for transmitting a response to the message that indicates whether the message is accepted or rejected.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 11 and 12 are diagrams illustrating example processes associated with admission control for an RRC setup procedure, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
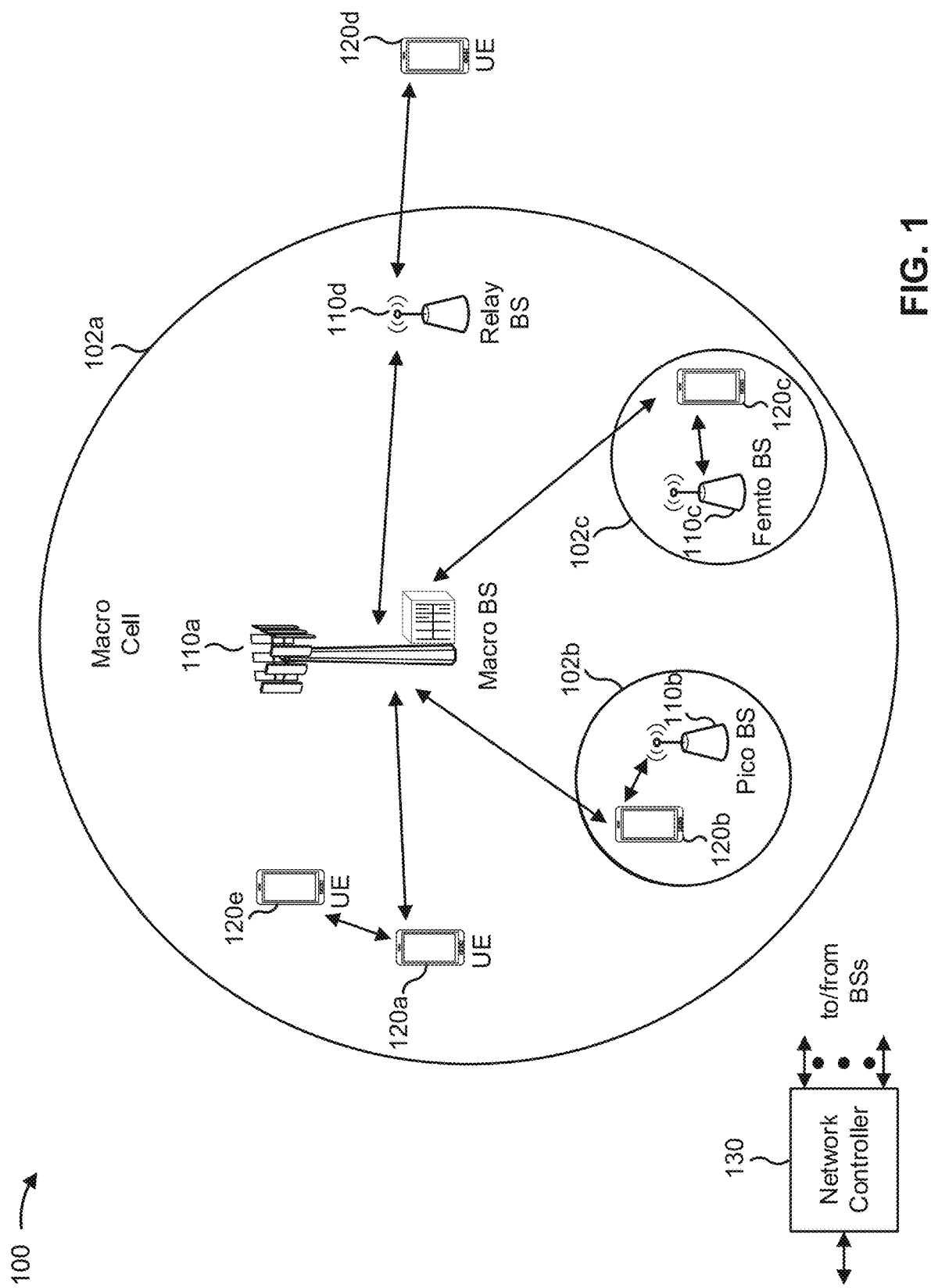
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the wireless network 100 may include one or more non-terrestrial network (NTN) deployments in which a non-terrestrial wireless communication device may include a BS (referred to herein, interchangeably, as a "non-terrestrial BS" and a "non-terrestrial base station"), a relay station (referred to herein, interchangeably, as a "non-terrestrial relay station"), and/or the like. As used herein, "NTN" may refer to a network for which access is facilitated by a non-terrestrial BS, a non-terrestrial relay station, and/or the like.

The wireless network 100 may include any number of non-terrestrial wireless communication devices. A non-terrestrial wireless communication device may include a satellite, a high-altitude platform (HAP), and/or the like. A HAP may include a balloon, a dirigible, a blimp, an airplane, an unmanned aerial vehicle, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, one or more components and/or devices included in a core network of wireless network 100, and/or the like.

As indicated above, FIG. 1 is provided as an example. Other examples may differ from what is described with regard to FIG. 1.

Figure 2:
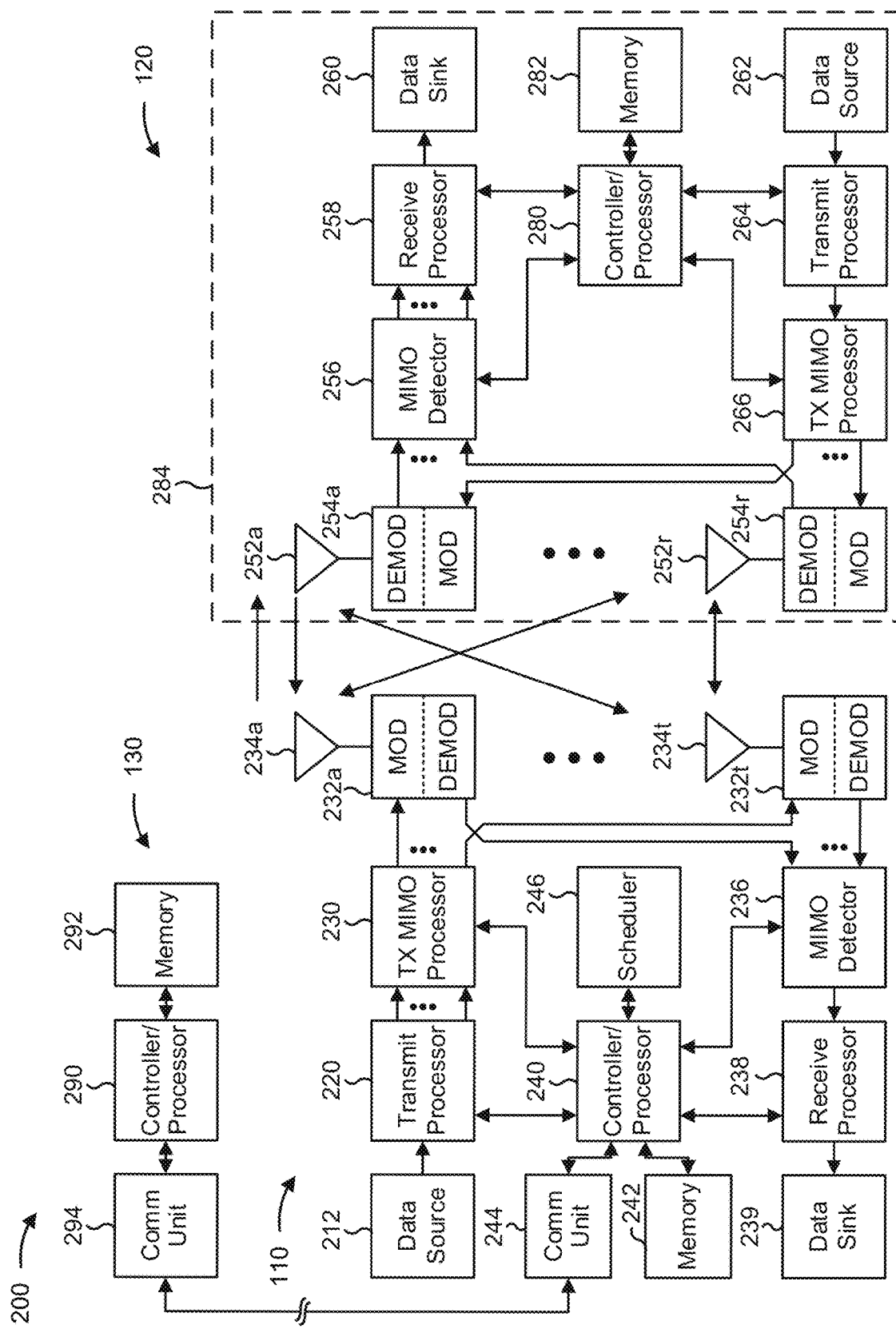
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with admission control for an RRC setup procedure, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for transmitting, to a base station associated with a non-terrestrial network and in connection with a random access procedure, a message that indicates a location of the user equipment; means for receiving a response to the message that indicates whether the message is accepted or rejected, the response being based at least in part on the location; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a user equipment and in connection with a random access procedure, a message that indicates a location of the user equipment; means for determining whether the message is accepted or rejected based at least in part on the location; means for transmitting a response to the message that indicates whether the message is accepted or rejected; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
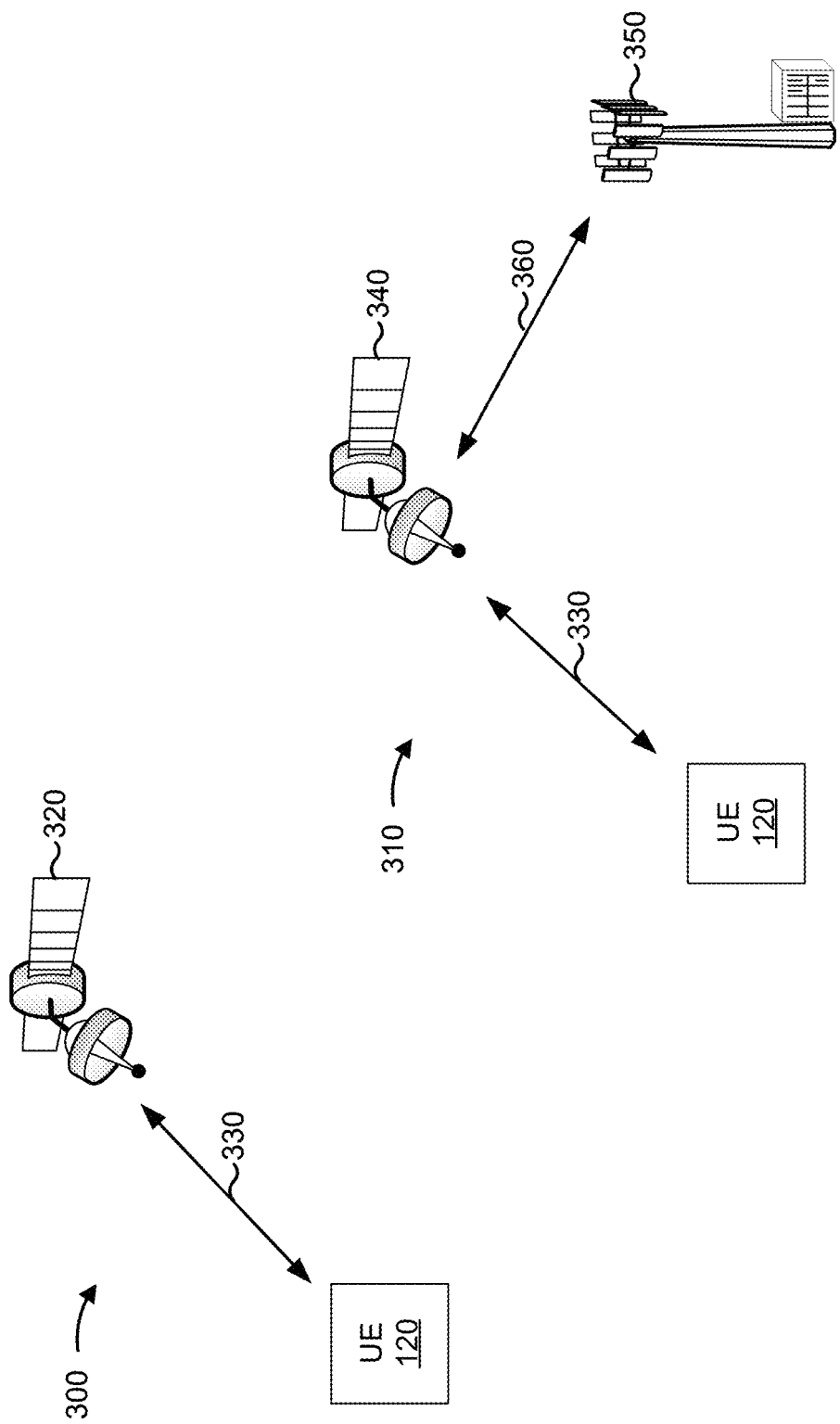
FIG. 3 is a diagram illustrating an example of a regenerative satellite deployment and an example of a transparent satellite deployment in a non-terrestrial network.

FIG. 3 is a diagram illustrating an example 300 of a regenerative satellite deployment and an example 310 of a transparent satellite deployment in a non-terrestrial network.

Example 300 shows a regenerative satellite deployment. In example 300, a UE 120 is served by a satellite 320 via a service link 330. For example, the satellite 320 may be or include a BS 110 (e.g., BS 110a), a gNB, and/or the like. In some aspects, the satellite 320 may be referred to as a non-terrestrial base station, a regenerative repeater, an onboard processing repeater, and/or the like. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be termed a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

As indicated above, FIG. 3 is provided as an example. Other examples may differ from what is described with regard to FIG. 3.

Figure 4:
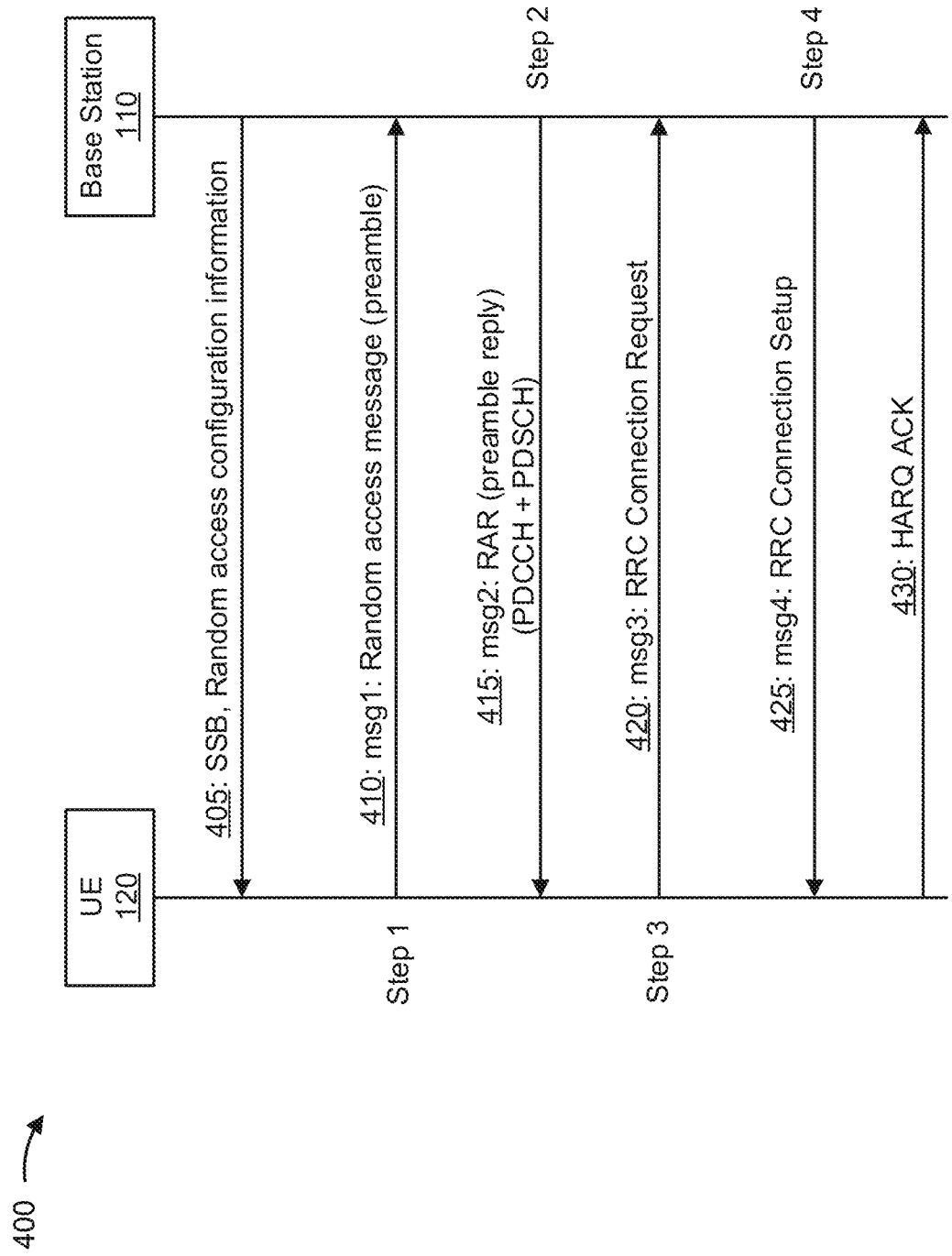
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like. In some aspects, the RRC connection request message may indicate a location of the UE 120, as described in more detail elsewhere herein.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

In some aspects, the UE 120 may transmit an RRC connection setup complete message (sometimes referred to as message 5, msg5, MSG5, or a fifth message of the four-step random access procedure). The RRC connection setup complete message may indicate that RRC connection setup based at least in part on the RRC connection setup message was successful. In some aspects, the RRC connection setup complete message may indicate a location of the UE 120, as described in more detail elsewhere herein.

As indicated above, FIG. 4 is provided as an example. Other examples may differ from what is described with regard to FIG. 4.

Figure 5:
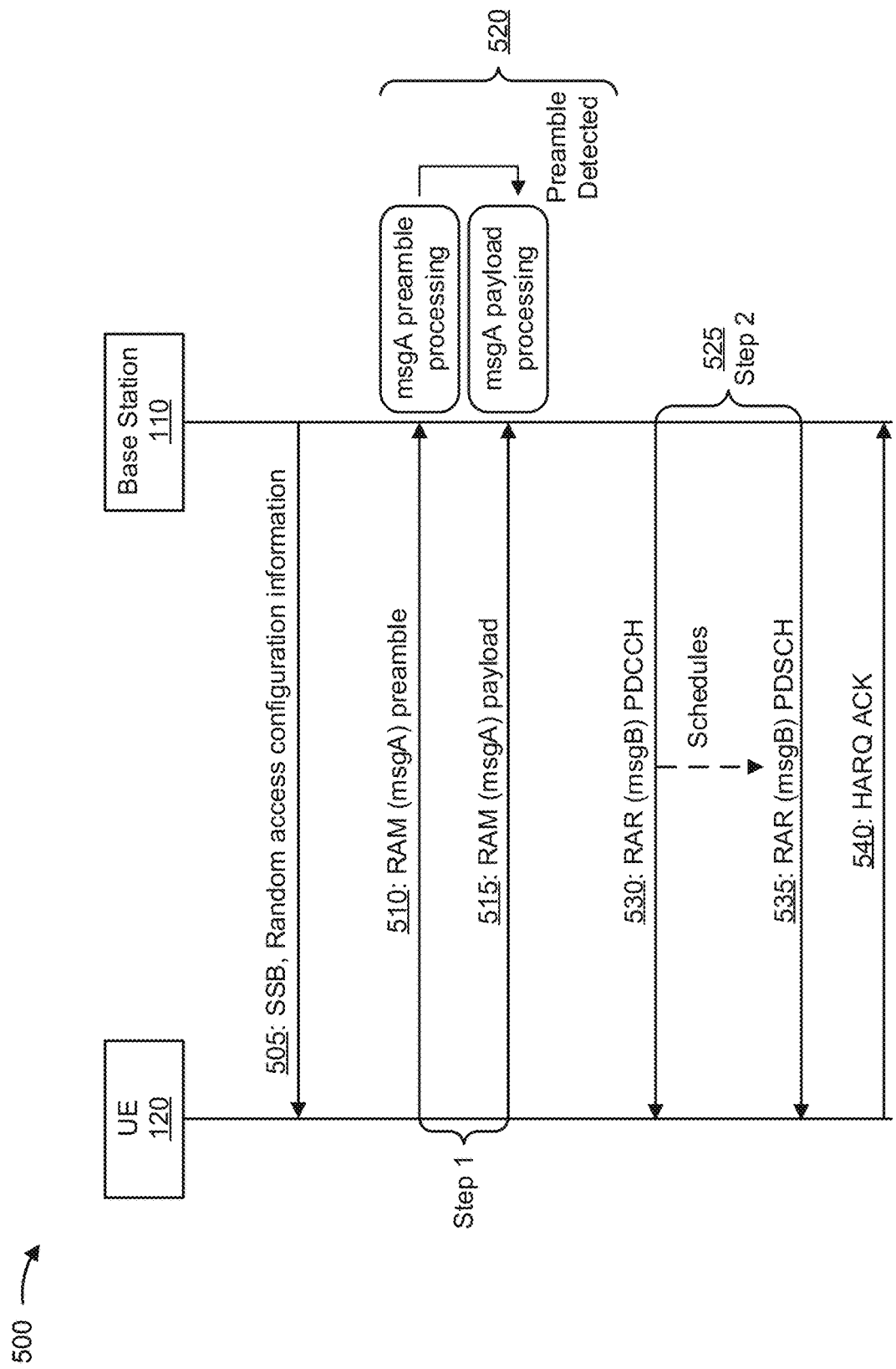
FIG. 5 is a diagram illustrating an example of a two-step random access procedure, in accordance with the present disclosure.

FIG. 5 is a diagram illustrating an example 500 of a two-step random access procedure, in accordance with the present disclosure. As shown in FIG. 5, a base station 110 and a UE 120 may communicate with one another to perform the two-step random access procedure.

As shown by reference number 505, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 510, the UE 120 may transmit, and the base station 110 may receive, a RAM preamble. As shown by reference number 515, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step random access procedure. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like). In some aspects, the RAM preamble and/or the RAM payload may indicate a location of the UE 120, as described in more detail elsewhere herein.

As shown by reference number 520, the base station 110 may receive the RAM preamble transmitted by the UE 120. If the base station 110 successfully receives and decodes the RAM preamble, the base station 110 may then receive and decode the RAM payload.

As shown by reference number 525, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 530, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 535, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 540, if the UE 120 successfully receives the RAR, the UE 120 may transmit a hybrid automatic repeat request (HARD) acknowledgement (ACK).

In some aspects, the UE 120 may transmit an RRC connection setup complete message. The RRC connection setup complete message may indicate that RRC connection setup based at least in part on the RRC connection setup message was successful. In some aspects, the RRC connection setup complete message may indicate a location of the UE 120, as described in more detail elsewhere herein.

As indicated above, FIG. 5 is provided as an example. Other examples may differ from what is described with regard to FIG. 5.

A satellite in an NTN may provide service to UEs covered by a cell for which service is provided by the satellite. As used herein, "satellite" refers to any non-terrestrial wireless communication device, as described in connection with FIGS. 1 and 3. Cells in NTNs may generally be larger than cells in terrestrial networks. Furthermore, since a satellite in an NTN orbits the planet, the cell provided by the satellite may move across the ground. Thus, situations may arise when UEs in multiple distinct regions (from the perspective of the network) (such as two or more regions associated with different mobile country codes (MCCs), two or more regions associated with different type allocation codes (TACs), and/or the like) are covered by a single satellite and cell, which may not generally be expected in a terrestrial network.

Regions associated with different MCCs or TACs may be associated with different core networks. For example, a first MCC may be associated with a first core network, and a second MCC may be associated with a second core network different than the first core network. In a scenario when a cell covers two different regions with two different MCCs, and where a satellite providing service for the cell is associated with a first MCC, a UE in a region associated with a second MCC may initialize a connection with the satellite. For example, the UE may initiate a random access procedure, such as a physical random access (PRACH) procedure, to establish a connection with the satellite. However, certain communication establishment procedures occur via a core network. Thus, the satellite may not be able to transmit, to the UE via a core network associated with the first MCC, a radio resource control (RRC) reject message, or re-route the UE to an appropriate core network if the UE initiates the communication establishment procedure from the region associated with the second MCC. Thus, the UE may camp on a cell without performing a registration update to the first MCC, thereby decreasing coverage for UEs in the scenario when a cell covers two regions with different MCCs, and causing country-specific regulatory issues.

Some techniques and apparatuses described herein provide for a radio access network (e.g., a non-terrestrial wireless communication device or base station) to perform admission control for a communication establishment procedure (such as a random access procedure) based at least in part on a location of a UE during the random access procedure. For example, the UE may provide information indicating a location of the UE, such as information indicating an MCC of the UE, information indicating one or more neighbor cells of the UE (from which a location of the UE can be determined), or other information described herein. Based at least in part on the location of the UE, the radio access network may selectively accept or reject the connection with the UE, or may trigger a handover or redirection of the UE to another cell or beam. In this way, the radio access network can handle a random access attempt from a UE on a cell associated with a different MCC than a location of the UE, thereby reducing the likelihood of the UE improperly camping on the cell. Furthermore, latency and network interruption associated with the random access attempt are reduced.

Figure 6:
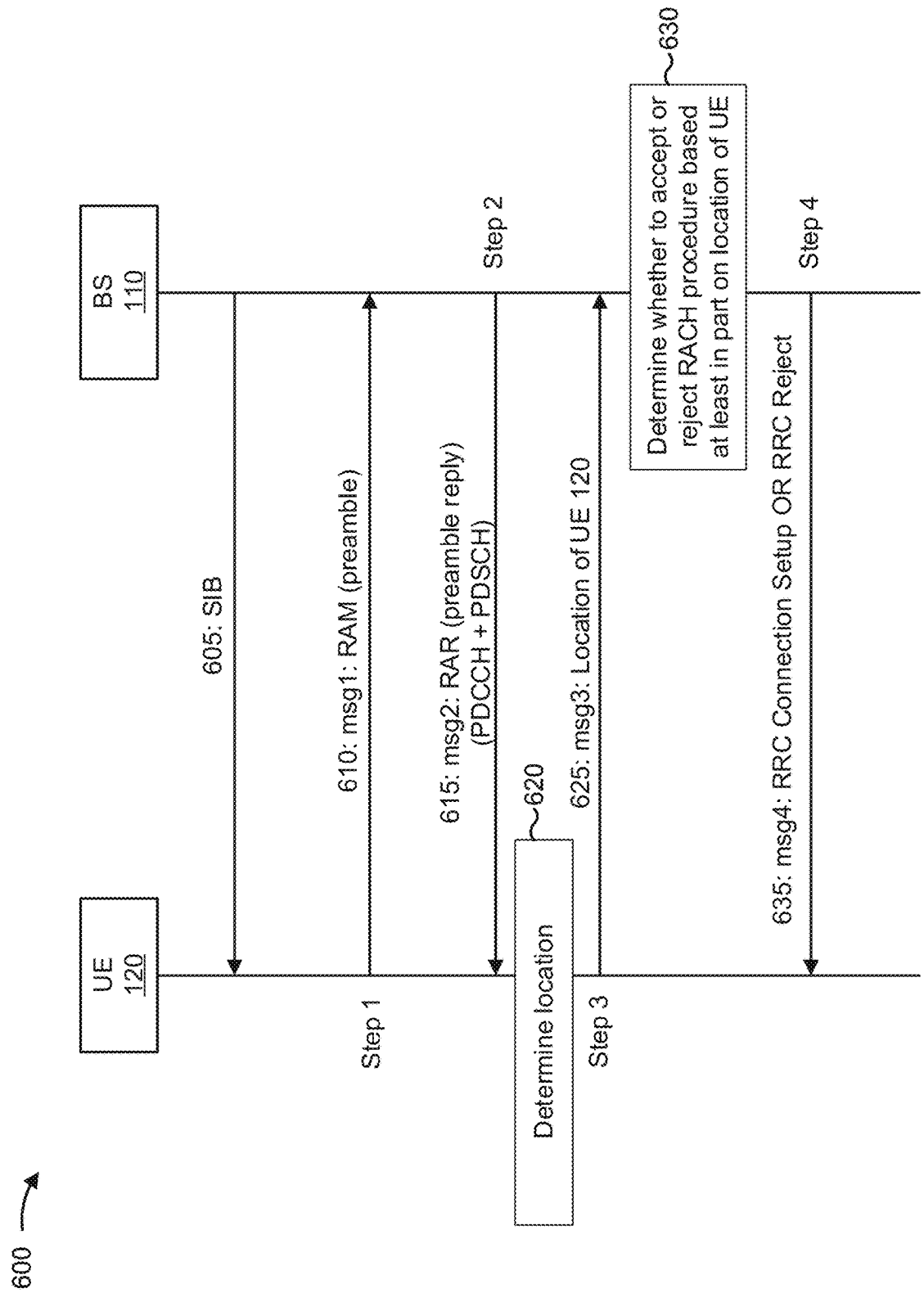
FIG. 6 is a diagram illustrating an example of signaling associated with location-based admission control for a non-terrestrial network, in accordance with the present disclosure.

FIG. 6 is a diagram illustrating an example 600 of signaling associated with location-based admission control for a non-terrestrial network, in accordance with the present disclosure. Example 600 relates to indication of a location associated with a UE in an RRC setup request message, such as four-step RACH Msg3 or the payload of a two-step RACH MsgA. As shown, example 600 includes a non-terrestrial wireless communication device, shown as BS 110, and a UE 120. While example 600 (and the other examples described herein) may refer to random access procedures, the operations described with regard to example 600 and the other examples described herein can be applied for other forms of communication establishment procedures.

As shown in FIG. 6, and by reference number 605, the BS 110 may transmit, and the UE 120 may receive, system information (e.g., a system information block (SIB) and/or the like). In some aspects, the system information may include information relating to transmitting information indicating a location of the UE 120 in connection with a random access procedure. For example, the system information may indicate whether the UE 120 is to provide information indicating a location of the UE 120 to the BS 110, or may indicate an approach for indicating the location. In some aspects, the BS 110 may transmit the system information indicating for the UE 120 to provide information indicating the location based at least in part on a cell provided by the BS 110 covering at least part of two or more regions.

In some aspects, the system information may indicate that the UE 120 is to use an MCC of the UE 120 to indicate the location. In some aspects, the system information may indicate that the UE 120 is to use a virtual cell identifier or a geographical zone identifier (e.g., a configured geographical zone identifier) to indicate the location.

In some aspects, the system information may indicate that the UE 120 is to indicate the location of the UE 120 based at least in part on a measurement by the UE 120, such as by reporting a set of physical cell identifiers (PCIs) or a set of beam identifiers for a set of strongest neighbor cells of the UE 120. For example, the system information may indicate which neighbor cells to measure and/or report. Additionally, or alternatively, the system information may indicate a condition, such as a condition based at least in part on a measurement threshold (e.g., a reference signal received power (RSRP) threshold, a reference signal received quality (RSRQ) threshold, a signal to interference plus noise ratio (SINR) threshold, and/or the like) to be used to determine whether to identify a measured cell as a location of the UE 120. In this case, the measurement threshold may be defined as a difference relative to a serving cell of the UE 120. In some aspects, information indicating the condition may be provided to the UE 120 (e.g., via unicast signaling or an RRC connection).

In some aspects, the system information may indicate a message class for an RRC setup request message that carries information indicating the location. For example, in some aspects, the RRC setup request message may use a 64-bit format, such as associated with an uplink common control channel (CCCH1) message class. In this case, the system information may indicate whether the RRC setup request message is to use the 64-bit format associated with the CCCH1 message class, or a format associated with a CCCH message class.

As shown by reference number 610, the UE 120 may transmit a RAM preamble to the BS 110. In some aspects, the UE 120 may use a preamble associated with requesting a larger uplink grant for a subsequent RAM. For example, if the UE 120 is to provide information indicating the location in RACH Msg3, then the UE 120 may use a RAM preamble to cause the BS 110 to provide, in the RAM, an uplink grant associated with a larger RACH Msg3. The UE 120 may select the RAM preamble from a pool of preambles or may use a dedicated PRACH resource to transmit the RAM preamble. As shown by reference number 615, the BS 110 may transmit a RAR, including a preamble reply, to the UE 120.

As shown by reference number 620, the UE 120 may determine a location of the UE 120. In some aspects, the UE 120 may determine an MCC indicating the location. In some aspects, the UE 120 may determine a virtual cell identifier indicating the location. In some aspects, the UE 120 may determine a zone identifier indicating the location. In some aspects, the UE 120 may perform one or more measurements to identify one or more neighbor cells of the UE 120. In this case, the one or more neighbor cells may be used to determine a location of the UE 120. Thus, information identifying the one or more neighbor cells is referred to herein as information indicating the location of the UE 120.

In some aspects, the UE 120 may determine that the UE 120 cannot determine a location. For example, the UE 120 may determine that measurements on neighbor cells have failed, and/or may determine that no zone identifier or virtual cell identifier can be determined, and thus may fail to determine a location. In this case, the UE 120 may transmit at least part of a 5G S temporary mobile subscriber identity (5G-S-TMSI), such as a larger portion of the 5G-S-TMSI than if the UE 120 successfully determined a location. In this case, the UE 120 may provide an indicator of whether a message (e.g., the message shown by reference number 625) indicates the location.

As shown by reference number 625, the UE 120 may transmit, in a RAM, information indicating the location of the UE 120. For example, in example 600, the UE 120 may transmit the information indicating the location of the UE 120 in a RRC setup request message. In some other aspects, the UE 120 may transmit the information indicating the location of the UE 120 in a different message, such as an RRC connection setup complete message, as described in connection with FIG. 7. The information indicating the location of the UE 120 may include, for example, an MCC, a virtual cell identifier, a zone identifier, information indicating one or more cells determined as neighbor cells (e.g., based at least in part on one or more measurements performed by the UE 120), a latitude and longitude value, and/or the like. In some aspects, the information indicating the location of the UE 120 may include a measurement report. The measurement report may include a list of one or more cells determined as strongest neighbor cells by the UE 120. In some aspects, the measurement report may include RSRP values for the list of one or more cells. The one or more cells may include NTN cells, terrestrial network cells, or a combination thereof. For a more detailed description of the content of the RAM, refer to FIGS. 9 and 10.

In some aspects, information indicating the location of the UE 120 may be encoded, encrypted, protected, and/or the like. For example, an identity of a cell or a beam (e.g., a beam identifier, a virtual cell identifier, a physical cell identifier, and/or the like) may be protected or encoded based at least in part on a key. In some aspects, the key may be pre-configured at the UE 120 (e.g., as part of an initial setup procedure of the UE 120, by an original equipment manufacturer of the UE 120, and/or the like). In some aspects, the key may be negotiated with the satellite or a public land mobile network (PLMN) associated with the UE 120. Thus, information regarding a location of a UE can be secured, which reduces the likelihood that such information is compromised, for example, for malicious purposes.

As shown by reference number 630, the BS 110 may determine whether to accept or reject the RACH procedure of the UE 120 based at least in part on the location of the UE 120. For example, the BS 110 may determine to accept the RACH procedure if the location of the UE 120 is within a region associated with a core network of the BS 110 (e.g., within a region associated with a same MCC as the BS 110, and/or the like). In some aspects, the BS 110 may determine to reject the RACH procedure based at least in part on the location being outside of a region associated with a core network of the BS 110 (e.g., in a region associated with a different MCC than an MCC associated with the BS 110). Additionally, or alternatively, the BS 110 may determine whether to accept or reject the RACH procedure based at least in part on a compatibility determination regarding core networks of respective regions of the BS 110 and the UE 120, load balancing concerns, and/or the like.

In some aspects, the BS 110 may determine the location. For example, based at least in part on measurement information received from the UE 120 in the RRC setup request message or another message, the BS 110 may communicate with a location management function or component to determine the UE 120's location and/or country based at least in part on the measurement information. The location management function may also provide the configuration information for the measurements to be performed by the UE 120 to locate the UE 120 and/or a country in which the UE 120 is located. In some aspects, the location management function may be co-located with the BS 110. In some aspects, the location management function may not be co-located with the BS 110.

As shown by reference number 635, the BS 110 may transmit a RACH msg4 to the UE 120. If the BS 110 accepts the RACH procedure, then the BS 110 may transmit an RRC connection setup message. If the BS 110 rejects the RACH procedure, then the BS 110 may transmit an RRC reject message. In some aspects, the RRC reject message may indicate a cause associated with the RRC reject message. For example, the RRC reject message may indicate that the RACH procedure is rejected based at least in part on the location of the UE 120. In some aspects, the RRC reject message may include a cause value indicating to the UE 120 to deprioritize a cell or beam that was used to indicate the location to the BS 110 (e.g., one or more cells or beams identified as neighbor cells or beams). In such a case, the UE 120 may deprioritize the cell or beam associated with the RRC reject message. Thus, the BS 110 may reduce the likelihood of the UE 120 selecting a cell associated with a different region than the BS 110, thereby conserving network resources associated with cell selection.

As indicated above, FIG. 6 is provided as an example. Other examples may differ from what is described with regard to FIG. 6.

Figure 7:
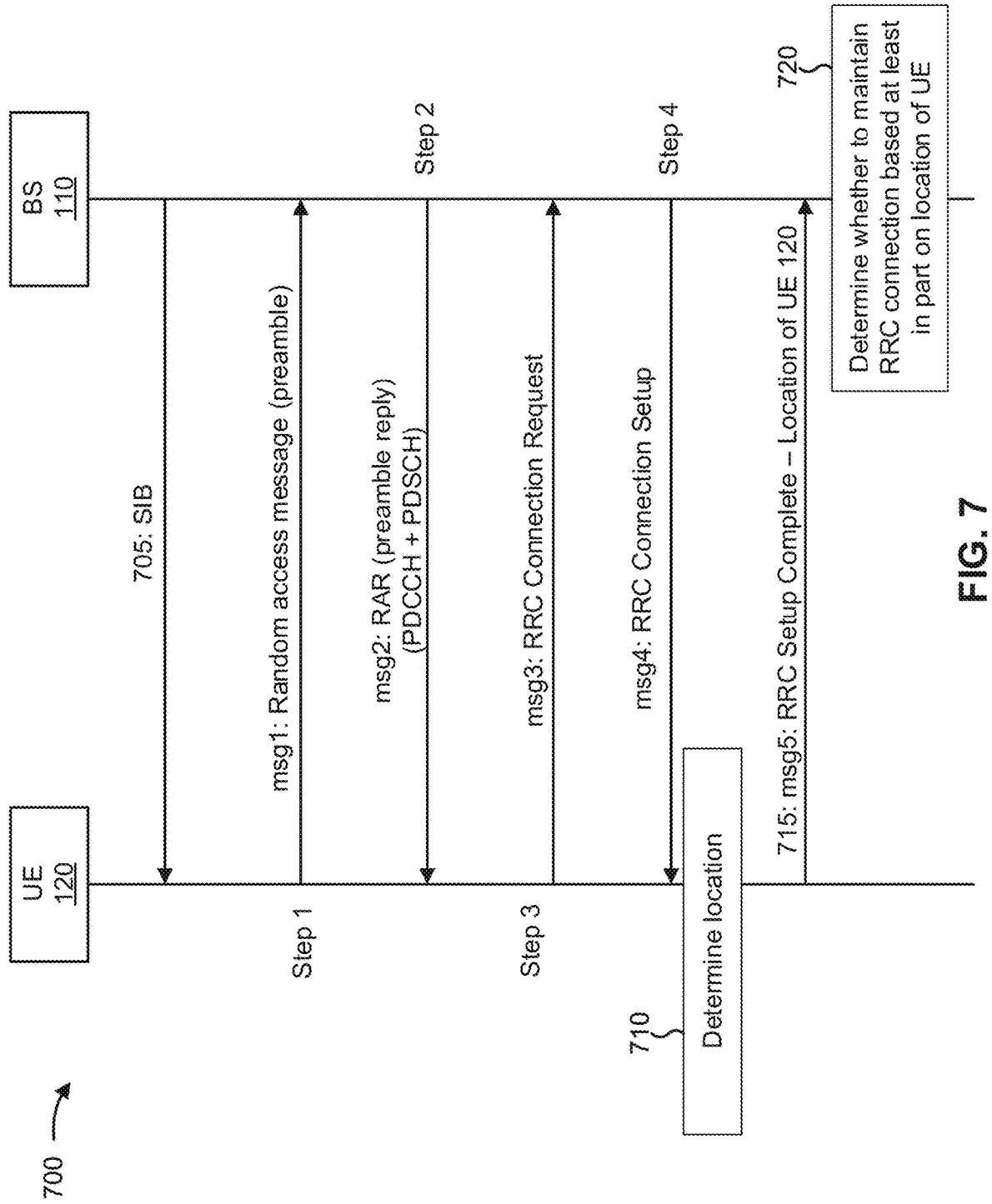
FIG. 7 is a diagram illustrating an example of signaling associated with location-based admission control for a non-terrestrial network, in accordance with the present disclosure.

FIG. 7 is a diagram illustrating an example 700 of signaling associated with location-based admission control for a non-terrestrial network, in accordance with the present disclosure. Example 700 relates to indication of a location associated with a UE 120 in an RRC setup complete message, such as a fifth message associated with a four-step RACH procedure.

As shown in FIG. 7, and by reference number 705, the BS 110 may transmit, and the UE 120 may receive, system information (e.g., a SIB). The system information is described in more detail in connection with reference number 605 of FIG. 6.

As further shown, the BS 110 and the UE 120 may perform a four-step RACH procedure, which is described in more detail in connection with FIG. 4. In some aspects, the BS 110 and the UE 120 may perform a two-step RACH procedure, which is described in more detail in connection with FIG. 5. As further shown, the BS 110 and the UE 120 may successfully complete the RACH procedure. For example, the BS 110 may transmit an RRC connection setup message (e.g., RAM msg4) to the UE 120 to configure an RRC connection.

As shown by reference number 710, the UE 120 may determine a location of the UE 120. The determination of the location of the UE 120 is described in more detail in connection with reference number 620 of FIG. 6. As shown by reference number 715, the UE 120 may transmit an RRC connection setup complete message (referred to as msg5 of a 4-step RACH procedure) that includes an indication of a location of the UE 120. For example, the indication of the location of the UE 120 may include any of the information described in connection with reference number 625 of FIG. 6. In some aspects, the indication of the location of the UE 120 may be encoded or protected, as is described in more detail in connection with FIG. 6.

As shown by reference number 720, the BS 110 may determine whether to maintain the RRC connection with the UE 120 based at least in part on the location. For example, the BS 110 may determine whether to keep the UE 120 in an RRC connected mode with the BS 110, redirect the UE 120 to another cell (e.g., an NTN cell or a terrestrial network cell), or trigger a handover to another cell. In some aspects, the BS 110 may perform this determination based at least in part on a measurement report from the UE 120. For example, if the UE 120 provides the information indicating the location of the UE 120 in a measurement report, the BS 110 may determine a target cell for a handover based at least in part on the measurement report.

As indicated above, FIG. 7 is provided as an example. Other examples may differ from what is described with regard to FIG. 7.

Figure 8:
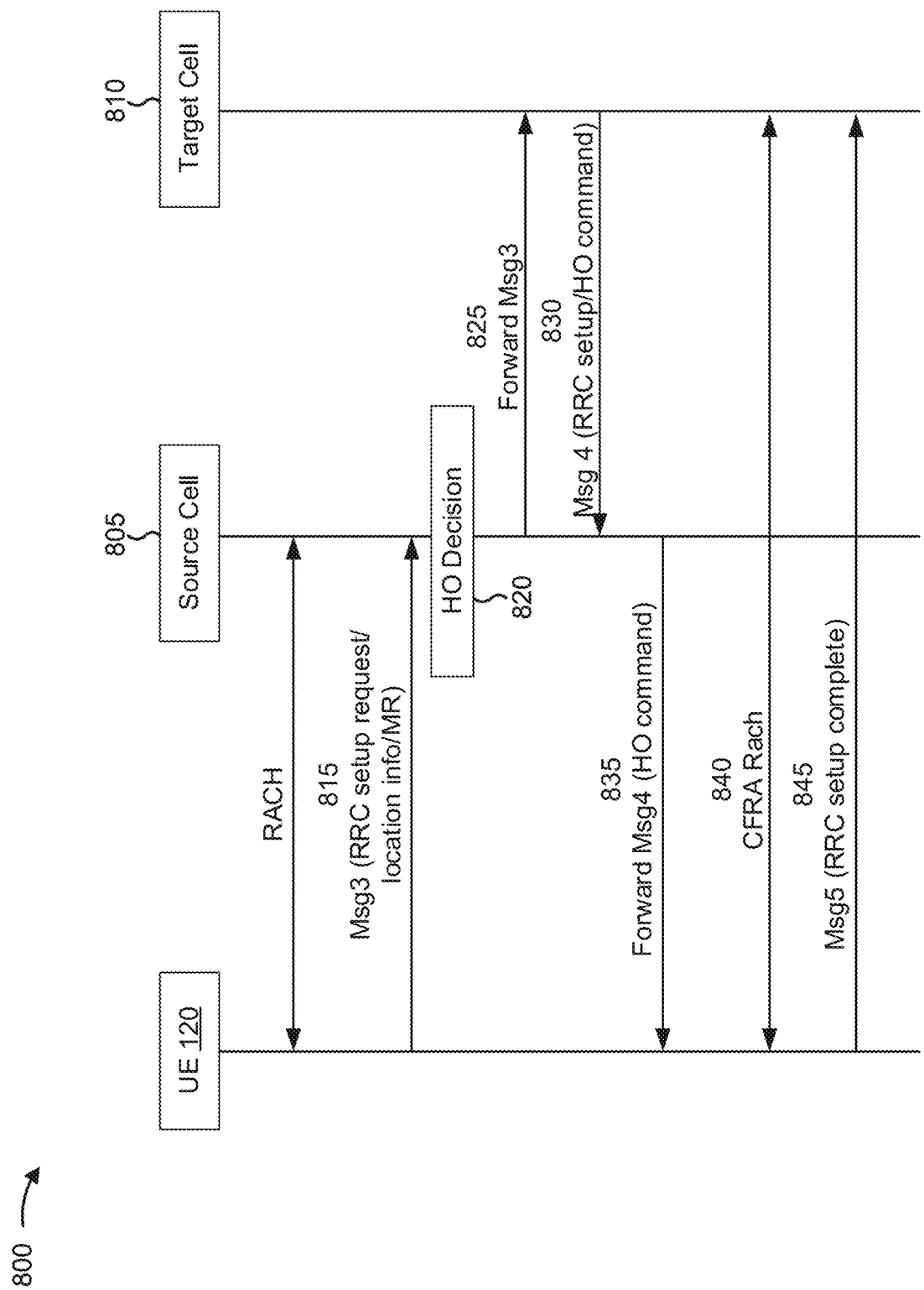
FIG. 8 is a diagram illustrating an example of a beam switch based at least in part on a location of a UE 120, in accordance with the present disclosure.

FIG. 8 is a diagram illustrating an example 800 of a beam switch based at least in part on a location of a UE 120, in accordance with the present disclosure. As shown, example 800 includes a UE 120, a source cell 805, and a target cell 810. Source cell 805 may be an NTN cell (e.g., provided by a non-terrestrial wireless communication device) or a terrestrial network cell. Target cell 810 may be an NTN cell or a terrestrial network cell. Source cell 805 and target cell 810 may be provided by different BSs (e.g., BS 110) or the same BS (e.g., BS 110).

In example 800, as shown by reference number 815, information indicating a location of the UE 120 is provided in an RRC setup request message, such as RACH Msg3. In some aspects, the information indicating the location of the UE 120 may be provided in an RRC setup complete message. At the time that the UE 120 transmits the information indicating the location of the UE 120, the UE 120 may not have been configured with application stratum (AS) security (e.g., the UE 120 may not have received a security mode command from the source cell 805).

As shown by reference number 820, the source cell 805 (e.g., a BS that provides the source cell) may determine that the UE 120 should be handed over to the target cell 810. For example, the source cell 805 may perform this determination based at least in part on the location of the UE 120 and/or a measurement report provided by the UE 120. Accordingly, as shown by reference number 825, the source cell 805 may forward, to the target cell 810, the RRC setup request message. As shown by reference number 830, the target cell 810 may provide, to the source cell 805, an RRC setup message and handover command for the UE 120. As shown by reference number 835, the source cell 805 may forward the RRC setup message and handover command to the UE 120. In some aspects, if the RRC connection has already been established (e.g., if the RACH procedure is complete), then the target cell 810 may provide an RRC reconfiguration message to the UE 120 via the source cell 805. As shown by reference number 840, the UE 120 may perform a contention-free random access channel (RACH) procedure with the target cell 810. As shown by reference number 845, the UE 120 may transmit an RRC reconfiguration complete or RRC setup complete message to the target cell. If the UE 120 transmits the RRC reconfiguration complete message, AS security and a dedicated radio bearer (DRB) associated with the target cell 810 may not yet have been added for the connection between the UE 120 and the target cell 810.

The operations described in connection with FIG. 8 can also be applied for an RRC resume procedure (e.g., for a UE 120 in an RRC inactive state).

Many of the operations described with regard to FIGS. 6-8 are described in the context of 4-step RACH procedures. However, these operations can also be performed for 2-step RACH procedures. For example, the information indicating the location of the UE 120 can be transmitted in RACH Msg3 or RACH MsgA, and the RARs associated with this information can be transmitted in RACH Msg4 or RACH MsgB.

Figure 9:
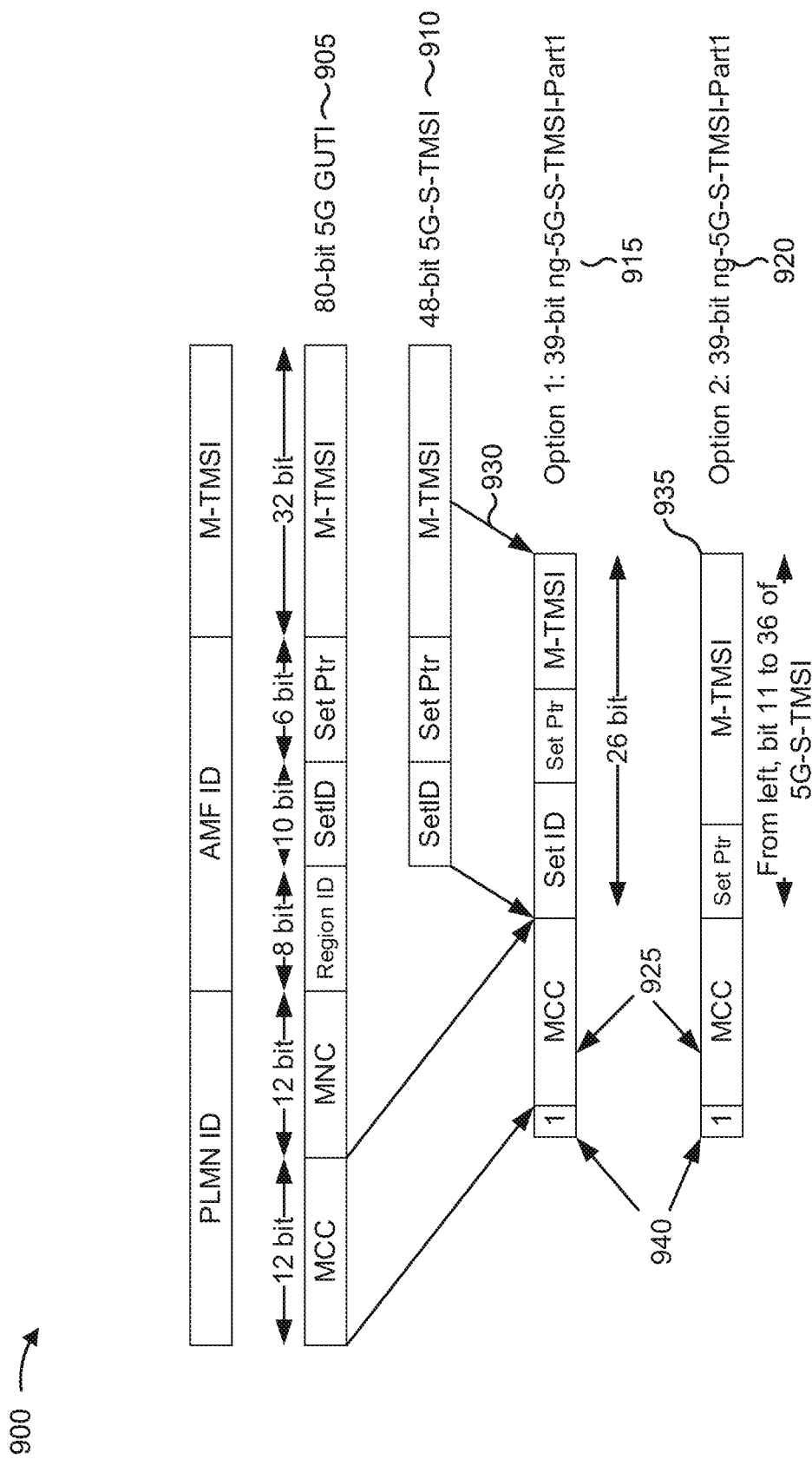
FIGS. 9 and 10 are diagrams illustrating examples of structures for an RRC setup request message, in accordance with the present disclosure.
Figure 10:
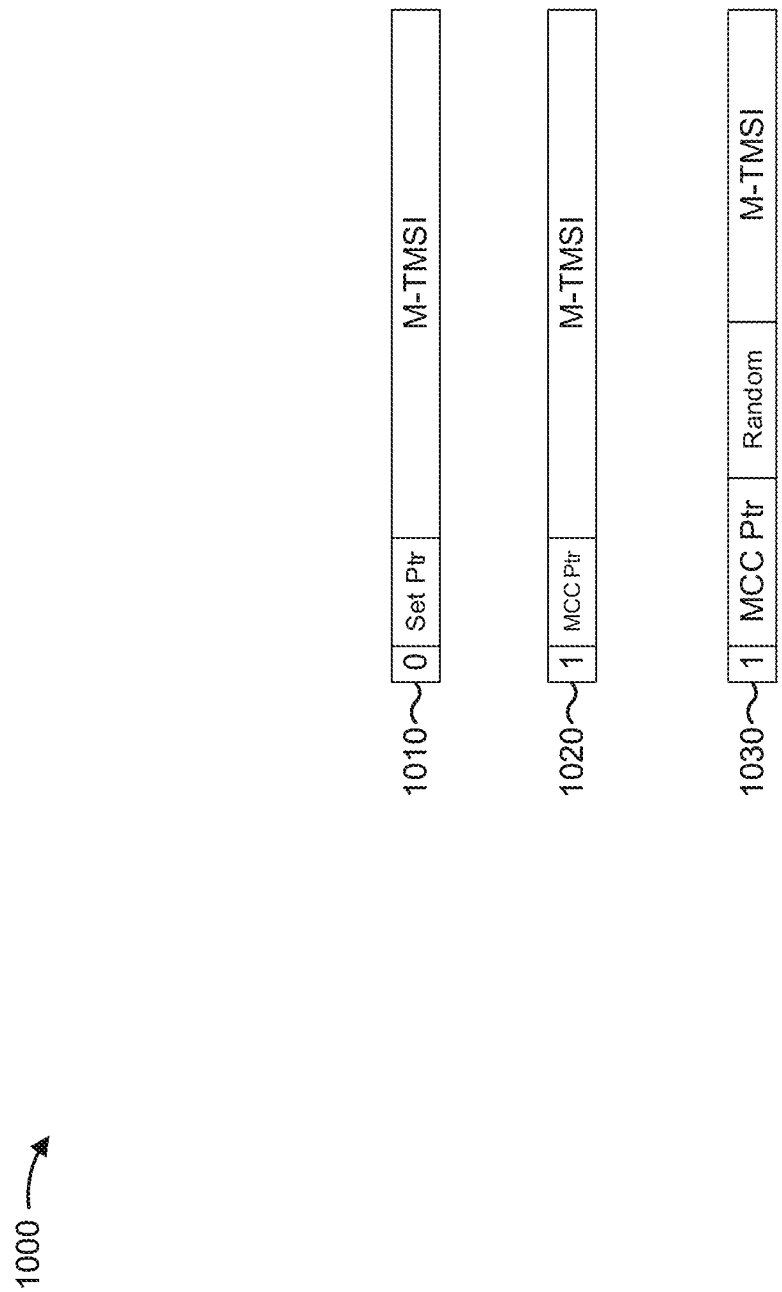

FIGS. 9 and 10 are diagrams illustrating examples 900 and 1000 of structures for an RRC setup request message, in accordance with the present disclosure. FIG. 9 shows an 80-bit 5G global unique temporary identifier (GUTI) 905 and a 48-bit 5G Service Architecture Evolution (SAE) Temporary Mobile Station Identifier (S-TMSI). As shown, the GUTI 905 includes a 12-bit MCC, a 12-bit mobile network code (MNC), an 8-bit region identifier, a 10-bit set identifier, a 6-bit set pointer to an access management function, and a 32-bit M-TMSI.

Reference numbers 915 and 920 show a first option (Option 1) and a second option (Option 2) for structures of the RRC setup request message. As shown by reference number 925, Option 1 and Option 2 include an MCC indicating the location of the UE 120. As shown by reference number 930, Option 1 includes a portion of the 5G-S-TMSI 910, such as the set identifier, the set pointer, and 10 bits of the M-TMSI. The MCC and the M-TMSI may indicate the location of the UE 120. In this case, a remainder of the 5G-S-TMSI 910 may be transmitted after the RACH procedure is completed. As shown by reference number 935, Option 2 includes the set pointer and a larger portion of the M-TMSI than Option 1. For example, Option 2 may include, from the left, bits 11 to 36 of the 5G-S-TMSI 910.

As shown by reference number 940, Option 1 and Option 2 include a bit indicator. In some aspects, the bit indicator may indicate whether the MCC is included in the RRC setup request (e.g., whether the MCC field is set to part of the UE 120's registered PLMN). For example, a first value of the bit indicator may indicate that the MCC is not included in the RRC setup request message and a second value of the bit indicator may indicate that the MCC is not included in the RRC setup request message. In some aspects, the bit indicator may indicate whether the rightmost 38 bits of the 5G-S-TMSI 910 are included in the RRC setup request message.

In some aspects, the RRC setup request message may include a random or pseudo-random value. The random or pseudo-random value may improve contention resolution by reducing the likelihood of two UEs transmitting identical RRC setup request messages. Examples of structures for the RRC setup request message incorporating random or pseudo-random values are shown in FIG. 10. As shown in FIG. 10, and by reference number 1010, when a bit indicator (e.g., bit indicator 94f0) is set to a first value, the RRC setup request message may not include an MCC or a random value. Reference numbers 1020 and 1030 show alternatives for the structure of the RRC setup request message. As shown by reference number 1020, in some aspects, when the bit indicator is set to a second value, the RRC setup request message may include the MCC (or a pointer to the MCC) and a rightmost 32 bits of the 5G-S-TMSI (e.g., 5G-S-TMSI 910). As shown by reference number 1030, in some aspects, when the bit indicator is set to the second value, the RRC setup request message may include the MCC or the pointer to the MCC, a random value (here, an 8-bit random value, though other lengths may be used), and a rightmost 24 bits of the 5G-S-TMSI.

In some aspects, the UE 120 may be configured with information indicating how to map the location of the UE 120 to the MCC pointer. In some aspects, the UE 120 may be configured with, or may receive via broadcast, information indicating whether to use the set pointer (e.g., as shown by reference number 1010) or the MCC (e.g., as shown by reference number 1020/1030) in the ng-5G-S-TMSI.

As indicated above, FIGS. 9 and 10 are provided as examples. Other examples may differ from what is described with regard to FIGS. 9 and 10.

Figure 11:
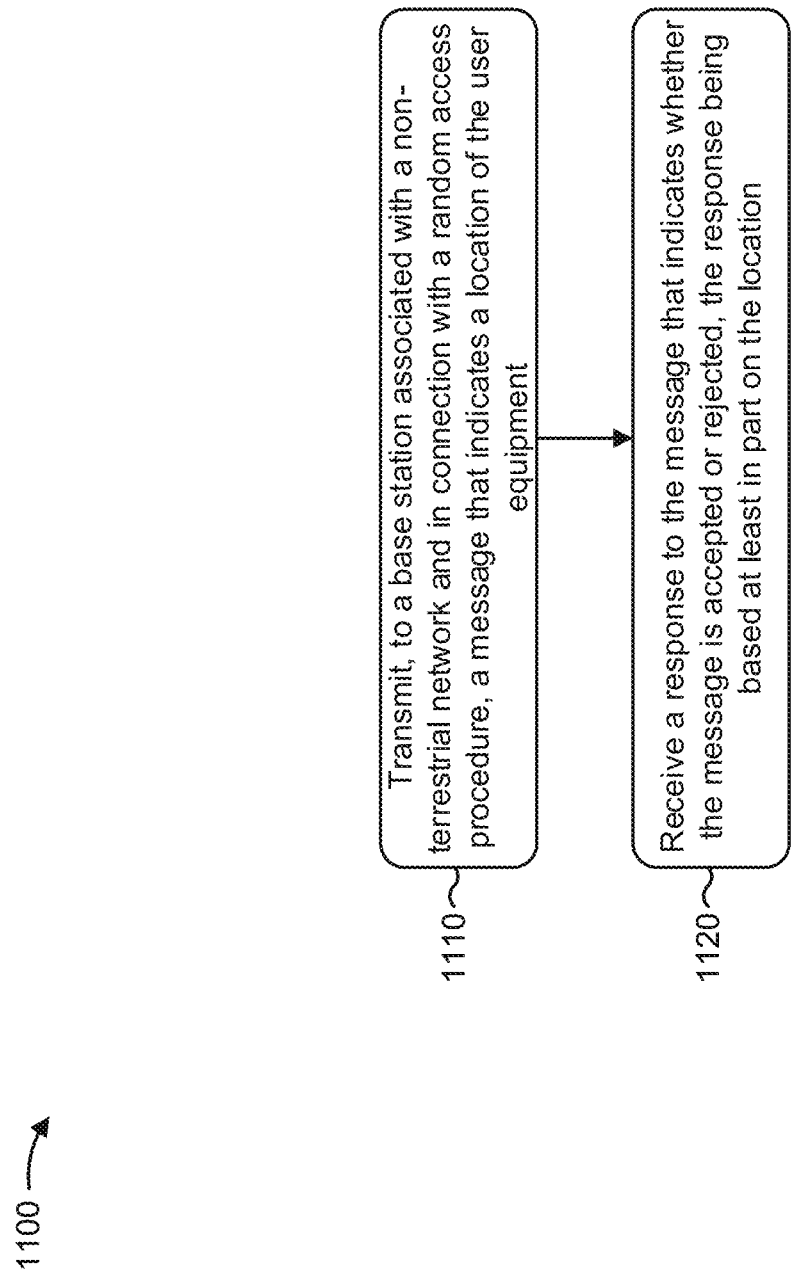

FIG. 11 is a diagram illustrating an example process 1100 performed, for example, by an user equipment, in accordance with the present disclosure. Example process 1100 is an example where the user equipment (e.g., user equipment 120 and/or the like) performs operations associated with admission control for an RRC setup procedure.

As shown in FIG. 11, in some aspects, process 1100 may include transmitting, to a base station associated with a non-terrestrial network and in connection with a random access procedure, a message that indicates a location of the user equipment (block 1110). For example, the user equipment (e.g., using receive processor 258, transmit processor 264, controller/processor 280, memory 282, and/or the like) may transmit, to a base station associated with a non-terrestrial network and in connection with a random access procedure, a message that indicates a location of the user equipment, as described above.

As further shown in FIG. 11, in some aspects, process 1100 may include receiving a response to the message that indicates whether the message is accepted or rejected, the response being based at least in part on the location (block 1120). For example, the user equipment (e.g., using receive processor 258, transmit processor 264, controller/processor 280, memory 282, and/or the like) may receive a response to the message that indicates whether the message is accepted or rejected, the response being based at least in part on the location, as described above.

Process 1100 may include additional aspects, such as any single aspect or any combination of aspects described below and/or in connection with one or more other processes described elsewhere herein.

With respect to process 1100, in a first aspect, process 1100 includes establishing a radio resource control connection with the base station based at least in part on the response indicating that the message is accepted.

With respect to process 1100, in a second aspect, alone or in combination with the first aspect, process 1100 includes deprioritizing a cell for which the random access procedure was performed based at least in part on the response indicating that the message is rejected.

With respect to process 1100, in a third aspect, alone or in combination with one or more of the first and second aspects, the response includes a value that indicates to deprioritize the cell.

With respect to process 1100, in a fourth aspect, alone or in combination with one or more of the first through third aspects, the message includes a country code that indicates the location and an indicator that the message indicates whether the country code is based at least in part on the location of the user equipment.

With respect to process 1100, in a fifth aspect, alone or in combination with one or more of the first through fourth aspects, the message includes at least a portion of a temporary mobile subscriber identity associated with the user equipment.

With respect to process 1100, in a sixth aspect, alone or in combination with one or more of the first through fifth aspects, the message includes a zone identifier or a virtual cell identifier that indicates the location.

With respect to process 1100, in a seventh aspect, alone or in combination with one or more of the first through sixth aspects, the message indicates the location based at least in part on a cell identifier or a beam identifier of a cell.

With respect to process 1100, in an eighth aspect, alone or in combination with one or more of the first through seventh aspects, the cell is determined to be a strongest neighbor cell of the user equipment based at least in part on a measurement performed by the user equipment.

With respect to process 1100, in a ninth aspect, alone or in combination with one or more of the first through eighth aspects, the message includes multiple cell identifiers or multiple beam identifiers.

With respect to process 1100, in a tenth aspect, alone or in combination with one or more of the first through ninth aspects, the cell identifier or the beam identifier is encoded based at least in part on a key associated with the base station or a key associated with a public land mobile network of the base station.

With respect to process 1100, in an eleventh aspect, alone or in combination with one or more of the first through tenth aspects, process 1100 includes receiving the key via system information.

With respect to process 1100, in a twelfth aspect, alone or in combination with one or more of the first through eleventh aspects, the message includes the cell identifier or the beam identifier based at least in part on a threshold being satisfied with regard to the cell.

With respect to process 1100, in a thirteenth aspect, alone or in combination with one or more of the first through twelfth aspects, process 1100 includes receiving, prior to transmitting the message, system information indicating to transmit the message that indicates the location of the user equipment.

With respect to process 1100, in a fourteenth aspect, alone or in combination with one or more of the first through thirteenth aspects, the random access procedure is a two-step random access procedure.

With respect to process 1100, in a fifteenth aspect, alone or in combination with one or more of the first through fourteenth aspects, the random access procedure is a four-step random access procedure.

With respect to process 1100, in a sixteenth aspect, alone or in combination with one or more of the first through fifteenth aspects, the message comprises a 64-bit radio resource control message.

With respect to process 1100, in a seventeenth aspect, alone or in combination with one or more of the first through sixteenth aspects, a preamble associated with the random access procedure indicates that the base station is to provide an uplink grant for the 64-bit radio resource control message.

With respect to process 1100, in an eighteenth aspect, alone or in combination with one or more of the first through seventeenth aspects, process 1100 includes receiving system information indicating to use the 64-bit radio resource control message.

With respect to process 1100, in a nineteenth aspect, alone or in combination with one or more of the first through eighteenth aspects, the message is transmitted on a CCCH1 logical channel.

With respect to process 1100, in a twentieth aspect, alone or in combination with one or more of the first through nineteenth aspects, the message of the user equipment includes at least part of an identifier of a registered public mobile land network of the user equipment and an indicator that the location is indicated by the identifier.

With respect to process 1100, in a twenty first aspect, alone or in combination with one or more of the first through twentieth aspects, the message includes an indicator of whether the location is identified by a registered public mobile land network of the user equipment or by a temporary mobile subscriber identity of the user equipment.

With respect to process 1100, in a twenty second aspect, alone or in combination with one or more of the first through twenty first aspects, the message includes an indicator of whether a random value field of the message includes a random value or information indicating the location of the user equipment.

With respect to process 1100, in a twenty third aspect, alone or in combination with one or more of the first through twenty second aspects, the message includes a pointer associated with a country code corresponding to the location and a portion of a temporary mobile subscriber identity of the user equipment.

With respect to process 1100, in a twenty fourth aspect, alone or in combination with one or more of the first through twenty third aspects, the message includes at least two of: a random or pseudo-random value, a set pointer to an access management function, a pointer associated with a country code corresponding to the location, or a portion of a temporary mobile subscriber identity associated with the user equipment.

With respect to process 1100, in a twenty fifth aspect, alone or in combination with one or more of the first through twenty fourth aspects, the message is at least one of: a radio resource control setup complete message, a radio resource control resume complete message, or a radio resource control reestablishment complete message.

With respect to process 1100, in a twenty sixth aspect, alone or in combination with one or more of the first through twenty fifth aspects, process 1100 includes deprioritizing a cell for which the random access procedure was performed based at least in part on the response indicating to release a radio resource control (RRC) connection associated with the random access procedure.

With respect to process 1100, in a twenty seventh aspect, alone or in combination with one or more of the first through twenty sixth aspects, process 1100 includes receiving a redirection message or a handover command for a target base station other than the base station, wherein the redirection is messaging or the handover command is based at least in part on the message; and establishing a connection with the target base station based at least in part on the redirection message or the handover command.

With respect to process 1100, in a twenty eighth aspect, alone or in combination with one or more of the first through twenty seventh aspects, the location is determined based at least in part on a measurement configuration provided by a location management component for neighbor cell measurement by the user equipment.

With respect to process 1100, in a twenty ninth aspect, alone or in combination with one or more of the first through twenty eighth aspects, the measurement configuration is provided in a radio resource control (RRC) setup message, an RRC reestablishment message, or an RRC resume message, and process 1100 further comprises performing a measurement based at least in part on the measurement configuration, wherein a measurement report or indication of whether the measurement is available or expected to be available is provided in response to the RRC setup message, the RRC reestablishment message, or the RRC resume message.

With respect to process 1100, in a thirtieth aspect, alone or in combination with one or more of the first through twenty ninth aspects, the message is transmitted in an uplink (UL) common control channel (CCCH) message.

With respect to process 1100, in a thirty-first aspect, alone or in combination with one or more of the first through thirtieth aspects, the message includes the cell identifier or the beam identifier based at least in part on at least one of: a threshold being satisfied for a given time duration with regard to the cell, or a signal quality associated with the cell identifier or the beam identifier increasing (e.g., gradually increasing) for a given time period.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station, in accordance with the present disclosure. Example process 1200 is an example where the base station (e.g., BS 110 and/or the like) performs operations associated with admission control for an RRC setup procedure.

As shown in FIG. 12, in some aspects, process 1200 may include receiving, from a user equipment and in connection with a random access procedure, a message that indicates a location of the user equipment (block 1210). For example, the base station (e.g., using antenna 234, DEMOD 232, MIMO detector 236, receive processor 238, controller/processor 240, and/or the like) may receive, from a user equipment and in connection with a random access procedure, a message that indicates a location of the user equipment, as described above.

As further shown in FIG. 12, in some aspects, process 1200 may include determining whether the message is accepted or rejected based at least in part on the location (block 1220). For example, the base station (e.g., using antenna 234, DEMOD 232, MIMO detector 236, receive processor 238, controller/processor 240, and/or the like) may determine whether the message is accepted or rejected based at least in part on the location, as described above.

As further shown in FIG. 12, in some aspects, process 1200 may include transmitting a response to the message that indicates whether the message is accepted or rejected (block 1230). For example, the base station (e.g., using controller/processor 240, transmit processor 220, TX MIMO processor 230, MOD 232, antenna 234, and/or the like) may transmit a response to the message that indicates whether the message is accepted or rejected, as described above.

Process 1200 may include additional aspects, such as any single aspect or any combination of aspects described below and/or in connection with one or more other processes described elsewhere herein.

With respect to process 1200, in a first aspect, process 1200 includes establishing a radio resource control connection with the user equipment based at least in part on the response, wherein the response is indicating that the message is accepted.

With respect to process 1200, in a second aspect, alone or in combination with the first aspect, process 1200 includes transmitting information indicating that the user equipment is to deprioritize a cell for which the random access procedure was performed based at least in part on determining that the message is rejected.

With respect to process 1200, in a third aspect, alone or in combination with one or more of the first and second aspects, the response includes a value that indicates to deprioritize the cell.

With respect to process 1200, in a fourth aspect, alone or in combination with one or more of the first through third aspects, the message includes a country code that indicates the location and an indicator that the message indicates the location of the user equipment.

With respect to process 1200, in a fifth aspect, alone or in combination with one or more of the first through fourth aspects, the message includes a at least portion of a temporary mobile subscriber identity associated with the user equipment.

With respect to process 1200, in a sixth aspect, alone or in combination with one or more of the first through fifth aspects, the message includes a zone identifier or a virtual cell identifier that indicates the location.

With respect to process 1200, in a seventh aspect, alone or in combination with one or more of the first through sixth aspects, the message indicates the location based at least in part on a cell identifier or a beam identifier of a cell.

With respect to process 1200, in an eighth aspect, alone or in combination with one or more of the first through seventh aspects, the cell is determined to be a strongest neighbor cell of the user equipment based at least in part on a measurement performed by the user equipment.

With respect to process 1200, in a ninth aspect, alone or in combination with one or more of the first through eighth aspects, the message includes multiple cell identifiers or multiple beam identifiers.

With respect to process 1200, in a tenth aspect, alone or in combination with one or more of the first through ninth aspects, the cell identifier or the beam identifier is encoded based at least in part on a key associated with the base station or a key associated with a public land mobile network associated with the base station.

With respect to process 1200, in an eleventh aspect, alone or in combination with one or more of the first through tenth aspects, process 1200 includes transmitting the key via system information.

With respect to process 1200, in a twelfth aspect, alone or in combination with one or more of the first through eleventh aspects, the message includes the cell identifier or the beam identifier based at least in part on a threshold being satisfied with regard to the cell.

With respect to process 1200, in a thirteenth aspect, alone or in combination with one or more of the first through twelfth aspects, process 1200 includes transmitting, prior to transmitting the message, system information indicating to transmit the message that indicates the location of the user equipment.

With respect to process 1200, in a fourteenth aspect, alone or in combination with one or more of the first through thirteenth aspects, the random access procedure is a two-step random access procedure.

With respect to process 1200, in a fifteenth aspect, alone or in combination with one or more of the first through fourteenth aspects, the random access procedure is a four-step random access procedure.

With respect to process 1200, in a sixteenth aspect, alone or in combination with one or more of the first through fifteenth aspects, the message comprises a 64-bit radio resource control message.

With respect to process 1200, in a seventeenth aspect, alone or in combination with one or more of the first through sixteenth aspects, a preamble associated with the random access procedure indicates that the base station is to provide an uplink grant for the 64-bit radio resource control message.

With respect to process 1200, in an eighteenth aspect, alone or in combination with one or more of the first through seventeenth aspects, process 1200 includes transmitting system information indicating to use the 64-bit radio resource control message.

With respect to process 1200, in a nineteenth aspect, alone or in combination with one or more of the first through eighteenth aspects, the message is received on a CCCH1 logical channel.

With respect to process 1200, in a twentieth aspect, alone or in combination with one or more of the first through nineteenth aspects, the message includes at least part of an identifier of a registered public mobile land network of the user equipment and an indicator that the location is indicated by the identifier.

With respect to process 1200, in a twenty first aspect, alone or in combination with one or more of the first through twentieth aspects, the message includes an indicator of whether the location is identified by a registered public mobile land network of the user equipment or by a temporary mobile subscriber identity of the user equipment.

With respect to process 1200, in a twenty second aspect, alone or in combination with one or more of the first through twenty first aspects, the message includes an indicator of whether a random value field of the message includes a random value or information indicating the location of the user equipment.

With respect to process 1200, in a twenty third aspect, alone or in combination with one or more of the first through twenty second aspects, the message includes a pointer associated with a country code corresponding to the location and a portion of a temporary mobile subscriber identity of the user equipment.

With respect to process 1200, in a twenty fourth aspect, alone or in combination with one or more of the first through twenty third aspects, the message includes at least two of: a random or pseudo-random value, a set pointer to an access management function, a pointer associated with a country code corresponding to the location, or a portion of a temporary mobile subscriber identity associated with the user equipment.

With respect to process 1200, in a twenty fifth aspect, alone or in combination with one or more of the first through twenty fourth aspects, the message is at least one of: a radio resource control setup complete message, a radio resource control resume complete message, or a radio resource control reestablishment complete message.

With respect to process 1200, in a twenty sixth aspect, alone or in combination with one or more of the first through twenty fifth aspects, process 1200 includes determining that the user equipment should be handed over or redirected to a target base station based at least in part on the location; and transmitting a redirection message or a handover command for the target base station.

With respect to process 1200, in a twenty seventh aspect, alone or in combination with one or more of the first through twenty sixth aspects, process 1200 includes determining the location based at least in part on the message that indicates the location and a communication with a location management component.

With respect to process 1200, in a twenty eighth aspect, alone or in combination with one or more of the first through twenty seventh aspects, determining the location is based at least in part on a measurement configuration that is provided based at least in part on the response to the message and based at least in part on a measurement report or an indication, in the message, of whether measurement is available.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A method of wireless communication performed by a user equipment, comprising: transmitting, to a base station associated with a non-terrestrial network and in connection with a random access procedure, a message that indicates a location of the user equipment; and receiving a response to the message that indicates whether the message is accepted or rejected, the response being based at least in part on the location.

Aspect 2: The method of Aspect 1, wherein the message is transmitted in an uplink (UL) common control channel (CCCH) message.

Aspect 3: The method of any of Aspects 1-2, further comprising: establishing a radio resource control connection with the base station based at least in part on the response indicating that the message is accepted.

Aspect 4: The method of any of Aspects 1-3, further comprising: deprioritizing a cell for which the random access procedure was performed based at least in part on the response indicating that the message is rejected.

Aspect 5: The method of Aspect 3, wherein the response includes a value that indicates to deprioritize the cell.

Aspect 6: The method of any of Aspects 1-5, wherein the message includes a country code that indicates the location and an indicator that the message indicates whether the country code is based at least in part on the location of the user equipment.

Aspect 7: The method of Aspect 6, wherein the message includes at least a portion of a temporary mobile subscriber identity associated with the user equipment.

Aspect 8: The method of any of Aspects 1-7, wherein the message includes a zone identifier or a virtual cell identifier that indicates the location.

Aspect 9: The method of any of Aspects 1-8, wherein the message indicates the location based at least in part on a cell identifier or a beam identifier of a cell.

Aspect 10: The method of Aspect 9, wherein the cell is determined to be a strongest neighbor cell of the user equipment based at least in part on a measurement performed by the user equipment.

Aspect 11: The method of Aspect 9, wherein the message includes multiple cell identifiers or multiple beam identifiers.

Aspect 12: The method of Aspect 9, wherein the cell identifier or the beam identifier is encoded based at least in part on a key associated with the base station or a key associated with a public land mobile network of the base station.

Aspect 13: The method of Aspect 12, further comprising: receiving the key via system information.

Aspect 14: The method of Aspect 9, wherein the message includes the cell identifier or the beam identifier based at least in part on a threshold being satisfied with regard to the cell.

Aspect 15: The method of Aspect 9, wherein the message includes the cell identifier or the beam identifier based at least in part on at least one of: a threshold being satisfied for a given time duration with regard to the cell, or a signal quality associated with the cell identifier or the beam identifier increasing for a given time period.

Aspect 16: The method of any of Aspects 1-15, further comprising: receiving, prior to transmitting the message, system information indicating to transmit the message that indicates the location of the user equipment.

Aspect 17: The method of any of Aspects 1-16, wherein the random access procedure is a two-step random access procedure.

Aspect 18: The method of any of Aspects 1-16, wherein the random access procedure is a four-step random access procedure.

Aspect 19: The method of any of Aspects 1-18, wherein the message comprises a 64-bit radio resource control message.

Aspect 20: The method of Aspect 19, wherein a preamble associated with the random access procedure indicates that the base station is to provide an uplink grant for the 64-bit radio resource control message.

Aspect 21: The method of Aspect 20, further comprising: receiving system information indicating to use the 64-bit radio resource control message.

Aspect 22: The method of Aspect 20, wherein the message is transmitted on a CCCH1 logical channel.

Aspect 23: The method of any of Aspects 1-22, wherein the message of the user equipment includes at least part of an identifier of a registered public mobile land network of the user equipment and an indicator that the location is indicated by the identifier.

Aspect 24: The method of any of Aspects 1-23, wherein the message includes an indicator of whether the location is identified by a registered public mobile land network of the user equipment or by a temporary mobile subscriber identity of the user equipment.

Aspect 25: The method of any of Aspects 1-24, wherein the message includes an indicator of whether a random value field of the message includes a random value or information indicating the location of the user equipment.

Aspect 26: The method of any of Aspects 1-25, wherein the message includes a pointer associated with a country code corresponding to the location and a portion of a temporary mobile subscriber identity of the user equipment.

Aspect 27: The method of any of Aspects 1-26, wherein the message includes at least two of: a random or pseudo-random value, a set pointer to an access management function, a pointer associated with a country code corresponding to the location, or a portion of a temporary mobile subscriber identity associated with the user equipment.

Aspect 28: The method of any of Aspects 1-27, wherein the message is at least one of: a radio resource control setup complete message, a radio resource control resume complete message, or a radio resource control reestablishment complete message.

Aspect 29: The method of Aspect 28, further comprising: deprioritizing a cell for which the random access procedure was performed based at least in part on the response indicating to release a radio resource control (RRC) connection associated with the random access procedure.

Aspect 30: The method of any of Aspects 1-29, further comprising: receiving a redirection message or a handover command for a target base station other than the base station, wherein the redirection message or the handover command is based at least in part on the message; and establishing a connection with the target base station based at least in part on the redirection message or the handover command.

Aspect 31: The method of any of Aspects 1-30, wherein the location is determined based at least in part on a measurement configuration provided by a location management component for neighbor cell measurement by the user equipment.

Aspect 32: The method of Aspect 31, wherein the measurement configuration is provided in a radio resource control (RRC) setup message, an RRC reestablishment message, or an RRC resume message, wherein the method further comprises performing a measurement based at least in part on the measurement configuration, and wherein a measurement report or indication of whether the measurement is available or expected to be available is provided in response to the RRC setup message, the RRC reestablishment message, or the RRC resume message.

Aspect 33: A method of wireless communication performed by a base station associated with a non-terrestrial network, comprising: receiving, from a user equipment and in connection with a random access procedure, a message that indicates a location of the user equipment; determining whether the message is accepted or rejected based at least in part on the location information; and transmitting a response to the message that indicates whether the message is accepted or rejected.

Aspect 34: The method of Aspect 33, wherein the message is transmitted in an uplink (UL) common control channel (CCCH) message.

Aspect 35: The method of any of Aspects 33-34, further comprising: establishing a radio resource control connection with the user equipment based at least in part on the response, wherein the response indicates that the message is accepted.

Aspect 36: The method of any of Aspects 33-35, further comprising: transmitting information indicating that the user equipment is to deprioritize a cell for which the random access procedure was performed based at least in part on determining that the message is rejected.

Aspect 37: The method of Aspect 36, wherein the response includes a value that indicates to deprioritize the cell.

Aspect 38: The method of any of Aspects 33-37, wherein the message includes a country code that indicates the location and an indicator that the message indicates whether the country code is based at least in part on the location of the user equipment.

Aspect 39: The method of Aspect 38, wherein the message includes a at least portion of a temporary mobile subscriber identity associated with the user equipment.

Aspect 40: The method of any of Aspects 33-39, wherein the message includes a zone identifier or a virtual cell identifier that indicates the location.

Aspect 41: The method of any of Aspects 33-40, wherein the message indicates the location based at least in part on a cell identifier or a beam identifier of a cell.

Aspect 42: The method of Aspect 41, wherein the cell is determined to be a strongest neighbor cell of the user equipment based at least in part on a measurement performed by the user equipment.

Aspect 43: The method of Aspect 41, wherein the message includes multiple cell identifiers or multiple beam identifiers.

Aspect 44: The method of Aspect 41, wherein the cell identifier or the beam identifier is encoded based at least in part on a key associated with the base station or a key associated with a public land mobile network associated with the base station.

Aspect 45: The method of Aspect 44, further comprising: transmitting the key via system information.

Aspect 46: The method of Aspect 41, wherein the message includes the cell identifier or the beam identifier based at least in part on a threshold being satisfied with regard to the cell.

Aspect 47: The method of Aspect 41, wherein the message includes the cell identifier or the beam identifier based at least in part on at least one of: a threshold being satisfied for a given time duration with regard to the cell, or a signal quality associated with the cell identifier or the beam identifier increasing for a given time period.

Aspect 48: The method of any of Aspects 33-47, further comprising: transmitting, prior to transmitting the message, system information indicating to transmit the message that indicates the location of the user equipment.

Aspect 49: The method of any of Aspects 33-48, wherein the random access procedure is a two-step random access procedure.

Aspect 50: The method of any of Aspects 33-48, wherein the random access procedure is a four-step random access procedure.

Aspect 51: The method of any of Aspects 33-50, wherein the message comprises a 64-bit radio resource control message.

Aspect 52: The method of Aspect 51, wherein a preamble associated with the random access procedure indicates that the base station is to provide an uplink grant for the 64-bit radio resource control message.

Aspect 53: The method of Aspect 52, further comprising: transmitting system information indicating to use the 64-bit radio resource control message.

Aspect 54: The method of Aspect 52, wherein the message is received on a CCCH1 logical channel.

Aspect 55: The method of any of Aspects 33-54, wherein the message includes at least part of an identifier of a registered public mobile land network of the user equipment and an indicator that the location is indicated by the identifier.

Aspect 56: The method of any of Aspects 33-55, wherein the message includes an indicator of whether the location is identified by a registered public mobile land network of the user equipment or by a temporary mobile subscriber identity of the user equipment.

Aspect 57: The method of any of Aspects 33-56, wherein the message includes an indicator of whether a random value field of the message includes a random value or information indicating the location of the user equipment.

Aspect 58: The method of any of Aspects 33-57, wherein the message includes a pointer associated with a country code corresponding to the location and a portion of a temporary mobile subscriber identity of the user equipment.

Aspect 59: The method of any of Aspects 33-58, wherein the message includes at least two of: a random or pseudo-random value, a set pointer to an access management function, a pointer associated with a country code corresponding to the location, or a portion of a temporary mobile subscriber identity associated with the user equipment.

Aspect 60: The method of any of Aspects 33-59, wherein the message is at least one of: a radio resource control setup complete message, a radio resource control resume complete message, or a radio resource control reestablishment complete message.

Aspect 61: The method of any of Aspects 33-60, further comprising: determining that the user equipment should be handed over or redirected to a target base station based at least in part on the location; and transmitting a redirection message or a handover command for the target base station.

Aspect 62: The method of any of Aspects 33-61, further comprising: determining the location based at least in part on the message that indicates the location and a communication with a location management component.

Aspect 63: The method of Aspect 62, wherein further comprising providing a measurement configuration based at least in part on the message and based at least in part on a measurement report or an indication, in the message, of whether measurement is available.

Aspect 64: An apparatus for wireless communication at a device, comprising a processor; memory coupled with the processor; and instructions stored in the memory and executable by the processor to cause the apparatus to perform the method of one or more of Aspects 1-63.

Aspect 65: A device for wireless communication, comprising a memory and one or more processors coupled to the memory, the one or more processors configured to perform the method of one or more of Aspects 1-63.

Aspect 66: An apparatus for wireless communication, comprising at least one means for performing the method of one or more of Aspects 1-63.

Aspect 67: A non-transitory computer-readable medium storing code for wireless communication, the code comprising instructions executable by a processor to perform the method of one or more of Aspects 1-63.

Aspect 68: A non-transitory computer-readable medium storing a set of instructions for wireless communication, the set of instructions comprising one or more instructions that, when executed by one or more processors of a device, cause the device to perform the method of one or more of Aspects 1-63.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment, comprising:
   a memory; and
   one or more processors, coupled to the memory, configured to:
   transmit, to a base station associated with a non-terrestrial network and in connection with a random access procedure, a message that indicates a location of the user equipment; and
   receive a response to the message that indicates whether the message is accepted or rejected, the response being based at least in part on the location.

2. The apparatus of claim 1, wherein the message is transmitted in an uplink (UL) common control channel (CCCH) message.

3. The apparatus of claim 1, wherein the one or more processors are further configured to:
   deprioritize a cell for which the random access procedure was performed based at least in part on the response indicating that the message is rejected.

4. The apparatus of claim 3, wherein the response includes a value that indicates to deprioritize the cell.

5. The apparatus of claim 1, wherein the message includes at least one of:
   a country code that indicates the location and an indicator that the message indicates whether the country code is based at least in part on the location of the user equipment, at least a portion of a temporary mobile subscriber identity associated with the user equipment,
   a zone identifier or a virtual cell identifier that indicates the location,
   a latitude and longitude value that indicates the location, or
   a cell identifier or a beam identifier of a cell.

6. The apparatus of claim 5, wherein the cell is determined to be a strongest neighbor cell of the user equipment based at least in part on a measurement performed by the user equipment.

7. The apparatus of claim 5, wherein the message includes multiple cell identifiers or multiple beam identifiers.

8. The apparatus of claim 5, wherein the cell identifier or the beam identifier is encoded based at least in part on a key associated with the base station or a key associated with a public land mobile network of the base station.

9. The apparatus of claim 8, wherein the one or more processors are further configured to:
   receive the key via system information.

10. The apparatus of claim 5, wherein the message includes the cell identifier or the beam identifier based at least in part on a threshold being satisfied with regard to the cell.

11. The apparatus of claim 5, wherein the message includes the cell identifier or the beam identifier based at least in part on at least one of:
    a threshold being satisfied for a given time duration with regard to the cell, or
    a signal quality associated with the cell identifier or the beam identifier increasing for a given time period.

12. The apparatus of claim 1, wherein the one or more processors are further configured to:
    receive, prior to transmitting the message, system information indicating to transmit the message that indicates the location of the user equipment.

13. The apparatus of claim 1, wherein the message comprises a 64-bit radio resource control message, wherein a preamble associated with the random access procedure indicates that the base station is to provide an uplink grant for the 64-bit radio resource control message, wherein the message is transmitted on a CCCH1 logical channel, and wherein the one or more processors are further configured to:
receive system information indicating to use the 64-bit radio resource control message.

14. The apparatus of claim 1, wherein the message of the user equipment includes at least one of:
at least part of an identifier of a registered public mobile land network of the user equipment and an indicator that the location is indicated by the identifier of the registered public mobile land network of the user equipment,
an indicator of whether the location is identified by a registered public mobile land network of the user equipment or by a temporary mobile subscriber identity of the user equipment,
an indicator of whether a random value field of the message includes a random value or information indicating the location of the user equipment,
a random or pseudo-random value,
a set pointer to an access management function,
a pointer associated with a country code corresponding to the location, or
a portion of the temporary mobile subscriber identity of the user equipment.

15. The apparatus of claim 1, wherein the message is at least one of:
a radio resource control setup complete message,
a radio resource control resume complete message, or
a radio resource control reestablishment complete message.

16. The apparatus of claim 15, wherein the one or more processors are further configured to:
deprioritize a cell for which the random access procedure was performed or prioritizing a target cell based at least in part on the response indicating to release a radio resource control (RRC) connection associated with the random access procedure.

17. The apparatus of claim 1, wherein the one or more processors are further configured to:
receive a redirection message or a handover command for a target base station other than the base station, wherein the redirection message or the handover command is based at least in part on the message; and
establish a connection with the target base station based at least in part on the redirection message or the handover command.

18. The apparatus of claim 1, wherein the location is determined based at least in part on a measurement configuration provided by a location management component for neighbor cell measurement by the user equipment.

19. The apparatus of claim 18, wherein the measurement configuration is provided in a radio resource control (RRC) setup message, an RRC reestablishment message, or an RRC resume message,
wherein the one or more processors are configured to perform a measurement based at least in part on the measurement configuration, and wherein a measurement report or indication of whether the measurement is available or expected to be available is provided in response to the RRC setup message, the RRC reestablishment message, or the RRC resume message.

20. An apparatus for wireless communication at a base station, comprising:
a memory; and
one or more processors, coupled to the memory, configured to:
receive, from a user equipment and in connection with a random access procedure, a message that indicates a location of the user equipment;
determine whether the message is accepted or rejected based at least in part on the location; and
transmit a response to the message that indicates whether the message is accepted or rejected.

21. The apparatus of claim 20, wherein the message is received in an uplink (UL) common control channel (CCCH) message.

22. The apparatus of claim 20, wherein the one or more processors are further configured to:
deprioritize a cell for which the random access procedure was performed based at least in part on the response indicating that the message is rejected.

23. The apparatus of claim 22, wherein the response includes a value that indicates to deprioritize the cell.

24. A method of wireless communication performed by a user equipment, comprising:
transmitting, to a base station associated with a non-terrestrial network and in connection with a random access procedure, a message that indicates a location of the user equipment; and
receiving a response to the message that indicates whether the message is accepted or rejected, the response being based at least in part on the location.

25. The method of claim 24, wherein the message is transmitted in an uplink (UL) common control channel (CCCH) message.

26. The method of claim 24, further comprising:
deprioritizing a cell for which the random access procedure was performed based at least in part on the response indicating that the message is rejected.

27. The method of claim 26, wherein the response includes a value that indicates to deprioritize the cell.

28. A method of wireless communication performed by a base station associated with a non-terrestrial network, comprising:
receiving, from a user equipment and in connection with a random access procedure, a message that indicates a location of the user equipment;
determining whether the message is accepted or rejected based at least in part on the location; and
transmitting a response to the message that indicates whether the message is accepted or rejected.

29. The method of claim 28, wherein the message is received in an uplink (UL) common control channel (CCCH) message.

30. The method of claim 28, further comprising:
deprioritizing a cell for which the random access procedure was performed based at least in part on the response indicating that the message is rejected.

* * * * *